United States Patent [19]
Rooney et al.

[11] Patent Number: 5,879,482
[45] Date of Patent: *Mar. 9, 1999

[54] RUN-FLAT LOW-PRESSURE ALL TERRAIN VEHICLE (ATV) TIRE

[75] Inventors: Timothy Michael Rooney, Munroe Falls; Thomas Reed Oare, Suffield, both of Ohio

[73] Assignee: Goodyear Tire & Rubber Company, Akron, Ohio

[ * ] Notice: The term of this patent shall not extend beyond the expiration date of Pat. No. 5,725,701.

[21] Appl. No.: 616,360

[22] Filed: Mar. 15, 1996

[51] Int. Cl.⁶ .................................................. B60C 17/00
[52] U.S. Cl. ..................... 152/209 B; 152/454; 152/517; 152/59; 152/555
[58] Field of Search .................................. 152/517, 539, 152/540, 544, 209 B, 209 R, 555, 454

[56] References Cited

U.S. PATENT DOCUMENTS

| | | | |
|---|---|---|---|
| 1,504,694 | 8/1924 | Litchfield | 152/209 R |
| 3,840,060 | 10/1974 | Tangorra | 152/353 R |
| 3,954,131 | 5/1976 | Hoshino et al. | 152/517 |
| 4,059,138 | 11/1977 | Mirtain et al. | 152/330 RF |
| 4,177,851 | 12/1979 | Gill et al. | 152/353 R |
| 4,192,368 | 3/1980 | Maiocchi | 152/544 |
| 4,295,509 | 10/1981 | Stein | 152/158 |
| 4,334,565 | 6/1982 | Stokes | 152/158 |
| 4,470,443 | 9/1984 | Eraud | 152/209 R |
| 4,708,186 | 11/1987 | Kopsco et al. | 152/516 |
| 4,727,917 | 3/1988 | Stewart | 152/209 B |
| 4,881,586 | 11/1989 | Shinomiya | 152/209 B |
| 4,921,029 | 5/1990 | Palinkas et al. | 152/11 |
| 4,934,425 | 6/1990 | Gajewski et al. | 152/323 |
| 4,940,069 | 7/1990 | Nakaski et al. | 152/544 |
| 4,945,962 | 8/1990 | Pajtas | 152/7 |
| 4,955,417 | 9/1990 | Igarashi | 152/454 |
| 5,042,544 | 8/1991 | Dehasse | 152/302 |
| 5,058,643 | 10/1991 | Nakasaki | 152/209 B |
| 5,078,192 | 1/1992 | Lindsey | 152/155 |
| 5,131,445 | 7/1992 | Tokeida et al. | 152/517 |
| 5,145,536 | 9/1992 | Noma et al. | 152/209 WT |
| 5,158,627 | 10/1992 | Saneto et al. | 152/510 |
| 5,186,772 | 2/1993 | Nakasaki et al. | 152/536 |
| 5,205,883 | 4/1993 | Kanamaru | 152/540 |
| 5,217,549 | 6/1993 | Johnson | 152/517 |
| 5,223,599 | 6/1993 | Gajewski | 528/59 |
| 5,238,040 | 8/1993 | Ghilardi | 152/517 |
| 5,259,429 | 11/1993 | Harns | 152/209 B |
| 5,265,659 | 11/1993 | Pajtas et al. | 152/329 |
| 5,368,082 | 11/1994 | Oare et al. | 152/517 |
| 5,375,640 | 12/1994 | Harms | 152/209 R |
| 5,427,166 | 6/1995 | Willard, Jr. | 152/454 |

OTHER PUBLICATIONS

English abstract for JP 63–293,198, Aug. 13, 1990.

*Primary Examiner*—Geoffrey L. Knable
*Attorney, Agent, or Firm*—David L. King

[57] ABSTRACT

The invention relates to a run-flat low inflation pressure all terrain vehicle (ATV) tire 10,11, wherein the tire 10,11 has at least one pair of elastomeric inserts 42,46, one insert 42,46 extending radially inward from each tread edge 14,16 toward a bead core 26. The radially inner end of the insert is radially inward of an elastomeric apex 48 located above the respective bead cores 26. The bead cores 26 have a wide substantially flat radially inner base which when the tire 10,11 is mounted on a conventional ATV design rim enable the tire 10,11 to remain seated onto the rim even when operating without any inflation. The preferred tire 10,11 has a unique tread 12. The central portion 13 of the tread 12 has circumferential rows of blocks or lugs 94. The lugs of laterally adjacent rows in a central region 13 of the tread 12 are connected by tie bars 93 which when employed on these run-flat tires keeps the tread lugs 94 in ground contact even when the tire is operated uninflated. The inventive tire 10,11 can be constructed providing limited run-flat capability or with a full run-flat capability never requiring air inflation during use.

13 Claims, 7 Drawing Sheets

RUN-FLAT LOW-PRESSURE ALL TERRAIN VEHICLE (ATV) TIRE

BACKGROUND OF THE INVENTION

The present invention relates to a run-flat low-pressure tire for all terrain vehicles (ATV) wherein the tire has a unique tread, sidewall structure and bead which permits the tire to be run even if the air is released by a puncture or the like. The inventive tire can be designed to provide limited run-flat capability or alternatively can be designed to operate nonpneumatically without any internal air pressure.

ATV tires are designed to work in assisting cooperation with the vehicles suspension system. Accordingly, the tires are wide and relatively tall in comparison to the nominal rim diameters which generally range from 8.0 inches to 12.00. These tires exhibit large air chambers which are held at pressures generally below 10 psi often about 2.9 psi and have relatively compliant sidewall structures which in combination with the vehicle suspension act as shock absorbing and vibration dampening components of the vehicle.

These vehicles operate in very rugged terrain and due in part to the low operating inflation pressures the ATV tires mounted on its conventional rim has been subject to becoming unseated in sharp cornering maneuvers. Even more problematic has been the tendency to have the beads unseat during an uninflated condition such as a tire puncture.

Eiji Nakaski of Sumitomo Rubber Industries recognized this concern and invented run-flat tires and rim assemblies for ATV vehicles. These tires described in U.S. Pat Nos. 4,940,069 and 5,186,772 have a protrusion radially and axially inward of the bead. The protrusion is adapted to fit over a hump in the rim and engage a depression or groove in the rim axially inward of the hump. The resultant fitment is said to enable the tire beads to stay on the special rim without the assistance of air inflation during normal operation.

Besides the obvious need to employ a special rim when using the prior art tire of Nakaski, the tire itself was prone to damage both on assembly but most particularly upon removal and repair. The protrusion could be easily torn and damaged and once damaged the tire was useless as a run-flat tire. Furthermore, the purposed range under run-flat conditions was 100 km.

The present invention discloses a novel bead design which enables run-flat functionality to be achieved with the use of the conventional 5° taper ATV rim.

The use of conventional rims with run-flat automobile tires was first commercially successful in the early 1990's when it was disclosed in U.S. Pat. No. 5,368,082, issued on Nov. 29, 1994, in the name of Thomas Oare, et al. This automobile run-flat tire employed a unique bead configuration and a very low aspect ratio carcass to achieve the desired run-flat results. Due to the short section height and relatively high weight load requirements the deflection of the tire under load was greatly limited. The present invention has uniquely different design constraints in that the aspect ratio of the ATV tires are generally 50% to 100% yielding a very tall sidewall section height (SH) that must also be sufficiently compliant to deflect about an inch acting as a shock absorbing assist to the comparatively primitive vehicle suspension of the ATV vehicle. The maximum load per ATV wheel position is lower than an automobile, generally less than 500 lbs/tire whereas the above-referenced automobile tire had a minimum load condition of approximately greater than 1,000 lbs. To better appreciate these differences an automobile suspension spring rate is about 200 lbs/in. Its associated auto run-flat tire will have a spring rate of 1,000 lbs./in. The ATV vehicle suspension struts have a spring rate of 80–100 lbs./in. Where as its associated run-flat tire has a spring rate of 160 lbs./in. to 200 lbs./in. In the ATV tire if the run-flat tire's spring rate is too high when the tire is operated inflated or noninflated, the rider will find the ride extremely harsh and difficult to control The present invention contemplates these unique ATV design constraints and teaches a novel tire structure which has excellent run-flat characteristics while maintaining the soft compliant ATV tire features without requiring a special rim.

SUMMARY OF THE INVENTION

A run-flat low-pressure all terrain vehicle tire 10,11 is disclosed. The tire has an annular tread 12. The tread 12 has a pair of lateral edges 14,16 as measured from the axially outermost portions of the lugs 94 at their radially outer surface, the distance between said edges defining the tread width (TW). The tire 10,11 has a pair of annular bead cores 26, a carcass 30 radially inward of the annular tread 12. The carcass 30 has one or more cord reinforced plies 38,40 extending to and wrapped about the bead cores 26, an elastomeric apex 48 adjacent to and extending radially outward from each bead core. Preferably, the apex 48 extends to a distance at least 25% of the section height (SH) of the tire 10,11.

The carcass 30 further includes a first pair of elastomeric inserts 42, at least one elastomeric insert 42 extends radially inwardly from each lateral edge 14,16 of the tread 12 toward each bead core 26 and terminates radially and axially inwardly of a radially outer portion of the elastomeric insert 48.

The tread 12 preferably has a plurality of tread lugs 94 extending radially outwardly from the tread. Within a central region 13 of the tread 12 the lugs 94 are connected by substantially laterally extending tie bars 93, one or more tie bars 93 connecting substantially circumferentially aligned tread lugs 94.

The run-flat tire according to the invention has annular bead cores 26 which have a substantially flat radially inner base 27. The inner 27 base has an inside diameter d and an axial width w. When the tire 10,11 is mounted on its design rim 82, the bead core 26 has a special fit relationship to the design rim. The rim is as specified by the Tire and Rim Industry Standards Association applicable in the locality of the tire's manufacture and has a bead seat 81 width W and a bead seat diameter (D) and a bead hump 80 having a diameter of ($D_H$). The tire 10,11 satisfies the relationship where the diameter d of the inner base of the bead core 27 is substantially equal to the diameter ($D_H$) and the width w of the inner base 27 of the bead core is in the range of 65% to 90% W of the design rim seat 81. For example, when the bead seat 81 is 0.400 inches the bead core 26 has a width W greater than 0.25 to about 0.36 inches.

The above-described tires 10,11 have a nominal rim diameter in the range of 8.0 to 12.0 inches, an outside or overall diameter of 26 inches or less and operates at a normal inflation of less than 10 psi, generally about 2.9 psi. The tires have a maximum section width SW which is in the range of 25% to 50% of the overall diameter.

In a preferred embodiment tire 11 the carcass includes a second pair of elastomeric inserts 46 extending radially between the tread edges 14,16 and the bead cores 26. The second inserts 46 are spaced axially outwardly from the first pair of inserts 42 and at least one carcass ply 38.

DEFINITIONS

Figure 1:
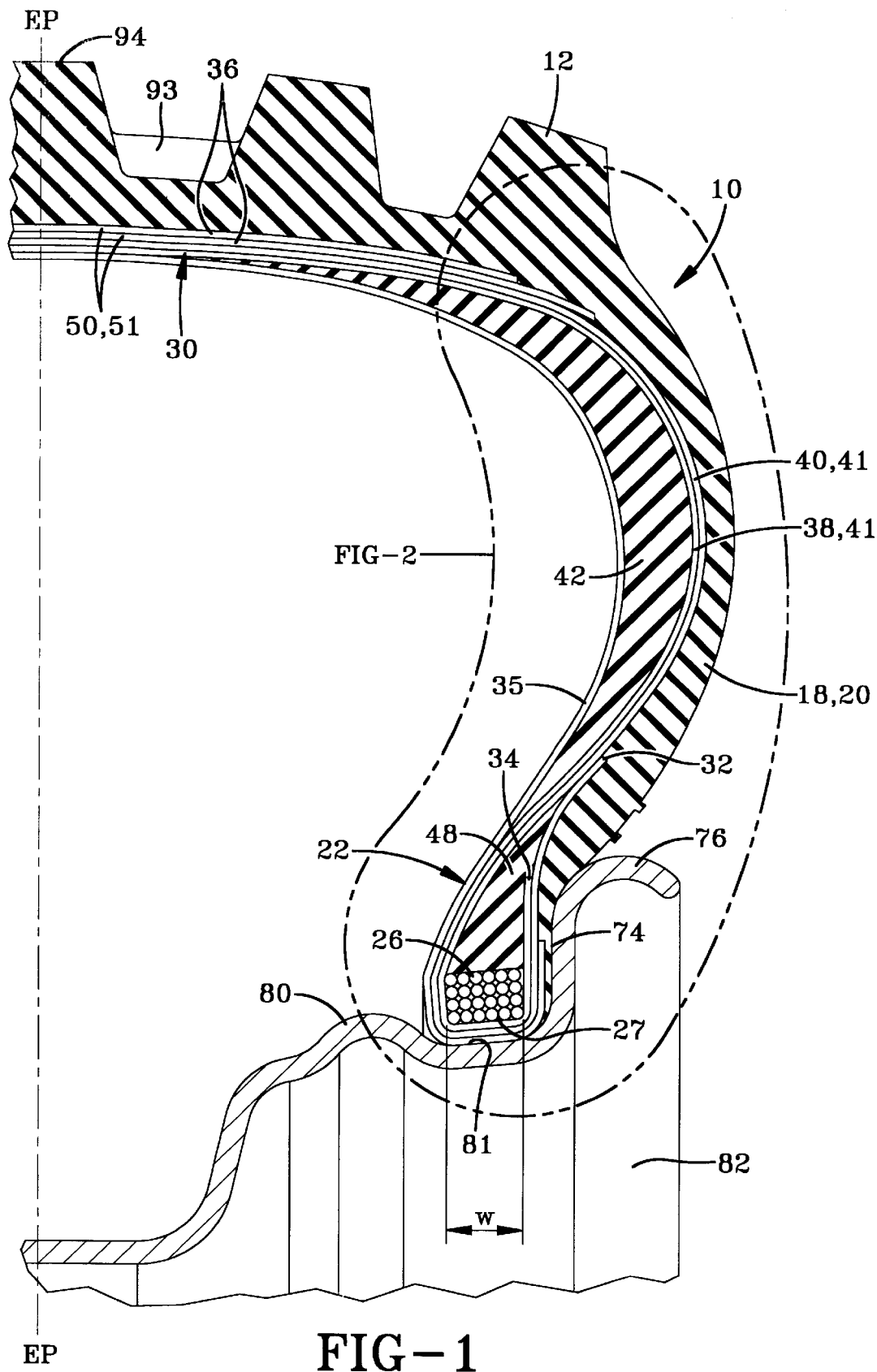
FIG. 1 is a cross-sectional view of a one-half of run-flat ATV tire made in accordance with one embodiment of the present invention and cut along the equatorial plane of the tire 10.

"All Terrain Vehicle (ATV)" is any motorized off-highway vehicle 50 inches (1270 mm) or less in overall width, with an unladen dry weight of 600 lbs (275 kg) or less, designed to travel on four low pressure tires, having a seat designed to be straddled by the operator and handlebars for steering control, and intended for use by a single operator and no passenger Width and weight shall be exclusive of accessories and optional equipment. ATV's are subdivided into four categories as follows:

Category G (General Use Model) ATV: An ATV intended for general recreational and utility use;

Category S (Sport Model) ATV: An ATV intended for recreational use by experienced operators only;

Category U (Utility Model) ATV: An ATV intended primarily for utility use.

Category Y (Youth Model) ATV: An ATV intended for recreational off-road use under adult supervision by operators under age 16. Youth model ATV's can further be categorized as follows:

Category Y-6 ATV: A Category Y-6 ATV is a youth model ATV which is intended for use by children age 6 and older.

Category Y-12 ATV: A Category Y-12 ATV is a youth model ATV which is intended for use by children age 12 and older.

"Aspect Ratio" means the ratio of its section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers. The bead or beads under the tread being encapsulated in tread rubber can be with or without other cord reinforced fabric elements.

"Belt or Breaker Structure" means at least two annular layers or plies of parallel cords, woven or unwoven, underlying the tread, unanchored to the bead, and having both left and right cord angles in the range from 17° to 27° with respect to the equatorial plane of the tire for radial ply tires and within 3° of the angle of the bias ply cords in a bias tire.

"Bias Ply Tire" means that the reinforcing cords in the carcass ply extend diagonally across the tire from bead-to-bead at about a 25°–65° angle with respect to the equatorial plane of the tire, the ply cords running at opposite angles in alternate layers.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Casing" means the carcass, belt structure, beads, sidewalls, and all other components of the tire excepting the tread and undertread. The casing may be new, unvulcanized rubber or previously vulcanized rubber to be fitted with a new tread.

"Chafers" refers to narrow strips of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Cord" means one of the reinforcement strands of which the plies in the tire are comprised.

"Deflection" means the reduction in section height of a loaded tire at a given inflation pressure.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to the tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tire bars" tending to maintain a rib-like character in the tread region involved.

"Innerliner" means the layer or layers of elastomer or other material that form the inside surface of a tubeless tire and that contain the inflating fluid within the tire.

"Lateral" means an axial direction.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Ply" means a continuous layer of rubber-coated parallel cords.

"Radial" and "radially" mean directions radially toward or away from the axis of rotation of the tire.

"Radial Ply Tire" means a pneumatic tire in which the ply cords which extend from bead to bead at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge, tread shoulder or shoulder rib means that portion of the tread near the shoulder.

"Sidewall" means that portion of a tire between the tread and the bead.

"Spring Rate" means the stiffness of the tire as the slope of the load-deflection curve at a given pressure.

"Tread" means that portion of the tire that comes into contact with the road under normal inflation and load.

"Tread Width" means the arc length of the tread surface in the axial direction, that is, in a plane parallel to the axis of rotation of the tire.

DETAILED DESCRIPTION OF THE PREFERRED EMBODIMENT

The invention shown in FIG. 1 and disclosed herein relates to a run-flat low-pressure tire 10 particularly suited for all terrain vehicles (ATV) and the like to include but not limited to off-road recreational, utility, golf cart, riding lawn mower and farm type vehicles.

The term run-flat as used in this patent means that the tire structure alone is sufficiently strong to support the vehicle load when the tire is operated in the uninflated condition, the sidewall and internal surfaces of the tire not collapsing or buckling onto themselves, without requiring any internal devices to prevent the tire from collapsing. Preferably, this means that under normal static maximum load and at the inflation pressure specified by the manufacture, the percent deflection is a value X, the percent of the deflected section height being 1-X. Under the same static load at a pressure of 0 psi, or in other words an uninflated condition, the percent of the deflected section height is at least 50%, preferably at least 75% of 1-X. For example, an AT23×7-10 limited runflat tire 10 inflated to 4 psi having a nonloaded section height of 6.55 inches when normally loaded will deflect about 0.77 inch or 12% . At 0 psi the same tire deflects about 17%. Thus, the deflected section height value at 4 psi is 88% and for the uninflated deflected value the deflected section height value is 83%.

The conventional pneumatic all terrain tire when operated without inflation collapses upon itself when supporting a vehicle load.

The reference numerals as depicted in the drawings are the same as those referred to in the specification. For purposes of this application the various embodiments illustrated in FIGS. 1–7 each use the same reference numerals for similar components. Only one-half of the tires are shown the opposite tire half not illustrated being identical to that portion shown.

Figure 3:
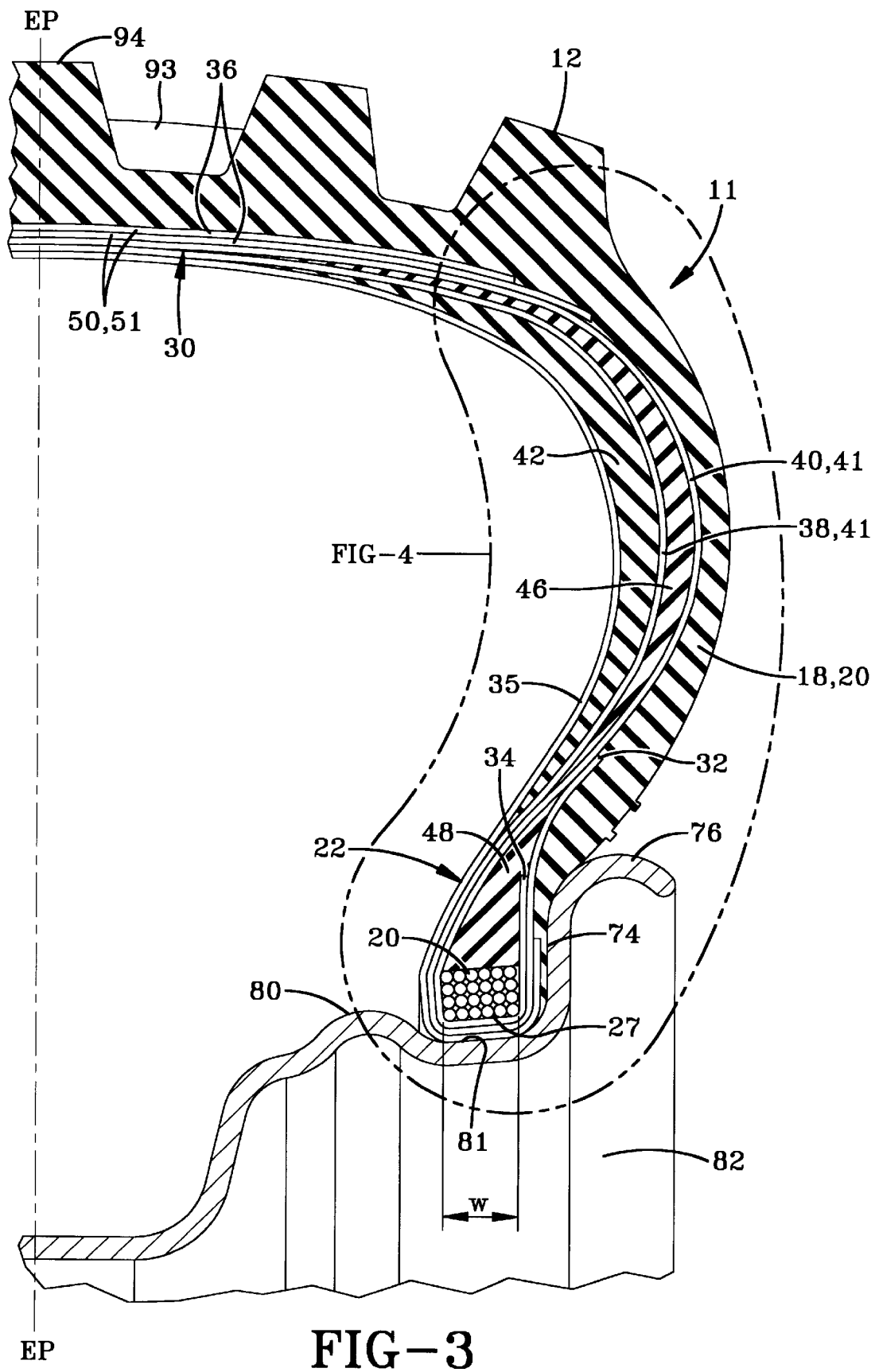
FIG. 3 is a cross-sectional view of one-half of a second embodiment of the run-flat ATV tire made in accordance with the present invention and cut along the equatorial plane of the tire 11.

The tires 10 and 11 according to the present invention employ a substantially light weight approach to achieve a run-flat ATV tire. Tires 10 and 11 as illustrated in FIGS. 1 and 3 are all terrain low pressure run-flat tires; the tires 10 and 11 are provided with a ground-engaging tread portion 12 which terminates in the shoulder portions at the lateral edges 14,16 of the tread 12 Sidewall portion 18,20 extends from tread lateral edges 14,16 respectively and terminates in a pair of bead regions 22 each having an annular inextensible bead core 26 respectively. The tires 10 and 11 are further provided with a carcass reinforcing structure 30 which extends from bead region 22 through sidewall portion 18, tread portion 12, sidewall portion 20 to bead region 22. The turnup ends 32,34 of carcass reinforcing structure 30 are preferably wrapped about bead cores 26 respectively The tires 10 and 11 may include a conventional innerliner 35 forming the inner peripheral surface of the tires 10 and 11, if the tires are to be of the tubeless type. One pair of tread reinforcing belt or breaker structures 36 may optionally be placed circumferentially about the radially outer surface of carcass reinforcing structure 30 beneath tread portion 12. In the particular embodiment illustrated, breaker structures 36 each comprises two cut breaker plies 50,51 and the cords of breaker plies 50,51 are oriented at an angle of about 63° with respect to the mid-circumferential centerplane of the tire.

The cords of breaker ply 50 are disposed in an opposite direction to the mid-circumferential centerplane and from that of the cords of breaker ply 51. However, the belt or breaker structures 36 if used in the ATV tire may comprise any number of belt or breaker plies of any desired configuration and the cords may be disposed at any desired angle. Belt or breaker structures 36 provide lateral stiffness across the belt width so as to help minimize lifting of the tread from the road surface during operation of the tire in the uninflated state as well as providing puncture resistance. In the embodiments illustrated, this can be accomplished by making the cords of belt or breaker plies 50, 51 of nylon or similar synthetic material.

It must be appreciated that the employment of a belt or breaker structure can have detrimental effects on ride and handling and therefore in many applications the use of such features may be undesirable for a particular ATV vehicle. Furthermore, these belt or breaker structures may be desirable on the front tires or the rear tires but not both the front and rear tires. One of ordinary skill in the tire building art can easily appreciate when such components should be employed and when they should be avoided.

Figure 2:
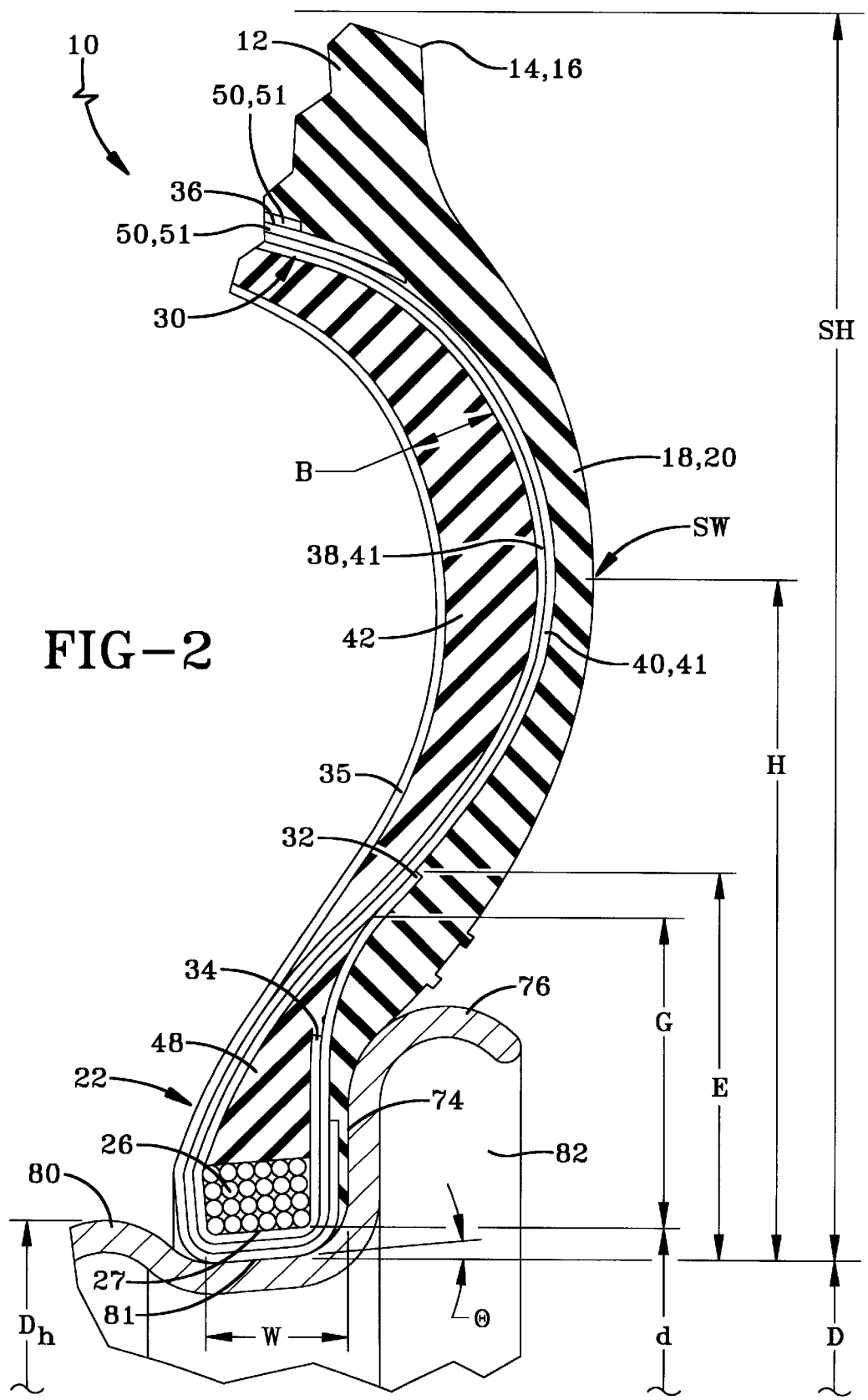
FIG. 2 is an enlarged fragmentary view of a tread shoulder, a sidewall, and a bead region of the run-flat tire of FIG. 1.

The first embodiment tire illustrated in FIGS. 1–2 shows the carcass reinforcing structure 30 which has at least one reinforcing ply structure 38. The reinforcing ply structure 38 has at least one ply layer of cords 41 for a radial ply tire, the cords 41 being oriented at an angle in the range of 65° to 90° relative to the equatorial plane and the structure 38 for a bias tire has at least two ply layers of cords 41, the cords of each adjacent layer being equal but oppositely oriented at an angle of 25° to 65° with respect to the equatorial plane of the tire.

As further illustrated in FIG. 1 and 2 the reinforcing ply structure 38 has turnup ends 32 which wrap about the bead core 26. The turnup ends terminate radially above the bead cores 26. The turnup ends 32 of the ply 38 terminates radially a distance E above the nominal rim diameter of the tire in proximity to the radial location of the maximum section width of the tire 10. In the preferred embodiment, the turnup ends 32 are located within 30% of the section height SH of the tire from the radial location of the maximum section width, most preferably terminating at a location half way between the radial location H of the maximum section width and the nominal rim diameter D.

Figure 4:
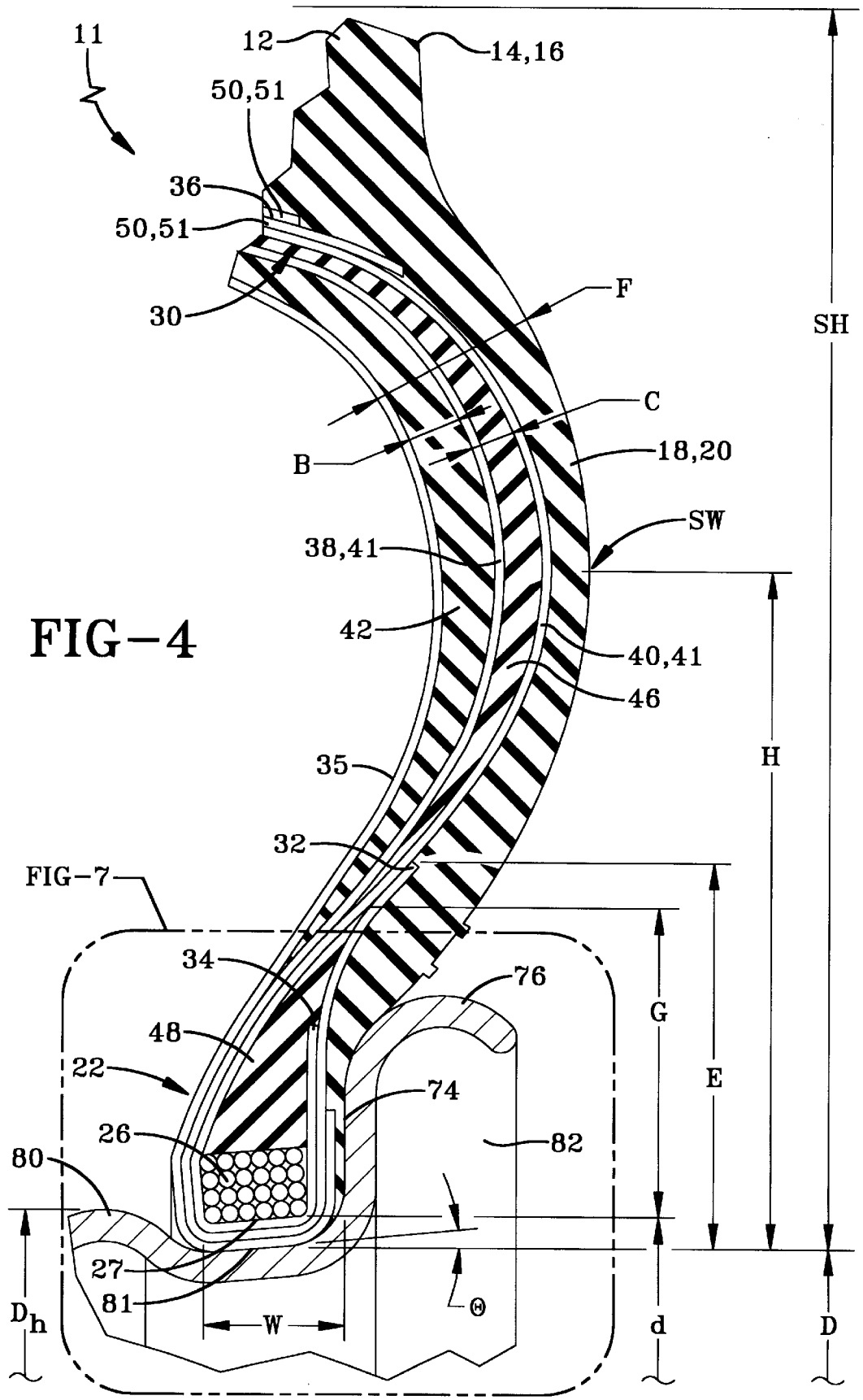
FIG. 4 is enlarged fragmenting view of the tread shoulder, a sidewall and a bead region of the second embodiment of the run-flat tire of FIG. 4.

The second embodiment tire 11 of FIGS. 3 and 4 illustrates a carcass reinforcing structure 30 which comprises at least two reinforcing ply structures 38,40. In the particular embodiment illustrated, there is provided a radially inner first reinforcing ply structure 38 and a radially outer second reinforcing ply structure 40, each ply structure 38,40 comprising at least one layer of parallel cords 41. The cords 41 of reinforcing ply structure 38,40 are oriented at an angle of at least 65 degrees with respect to the mid-circumferential centerplane CP or equatorial plane of the tire 11 for a radial ply carcass and the cords 41 in a bias tire construction are oriented in the range of 25° up to 65°. In the particular embodiment illustrated, the cords 41 are oriented at a bias angle of about 62 degrees with respect to the mid-circumferential centerplane CP adjacent layers being equal or oppositely oriented. The cords 41 of FIGS. 1–4 may be made of any material normally used for cord reinforcement of rubber articles, for example, and not by way of limitation, rayon, nylon and polyester. Preferably, the cords are made of material having a high adhesion property with rubber and high heat resistance. In the particular embodiments illustrated, the cords 41 are made from nylon. The first and second reinforcing ply structure 38,40 each preferably comprise a single ply layer, however, any number of carcass plies may be used.

As further illustrated in FIGS. 2 and 4, the first and second reinforcing ply structure 38,40 have turnup ends 32,34 which wrap about the bead core 26. The turnup ends 34 of the second ply 40 are adjacent to the bead core 26 and terminates radially above the bead core 26. The turnup ends 32 of the first ply 38 wrap about the second ply turnup ends 34 and the bead core 26. The turnup ends 32 of the first ply 38 terminates radially a distance E above the nominal rim diameter of the tire in proximity to a location half way between the radial location of the maximum section width of the tire 11 and the nominal rim diameter. In the preferred embodiment, the turnup ends 32 are located within 30% of the section height (SH) of the tire from the radial location of the maximum section width (SW), most preferably terminating at a location half way between the radial location of the maximum section width (SW) and the nominal rim diameter. In such a case the turnup end 32 of the first ply 38 can be radially above or below the second ply turnup end 34.

Figure 7:
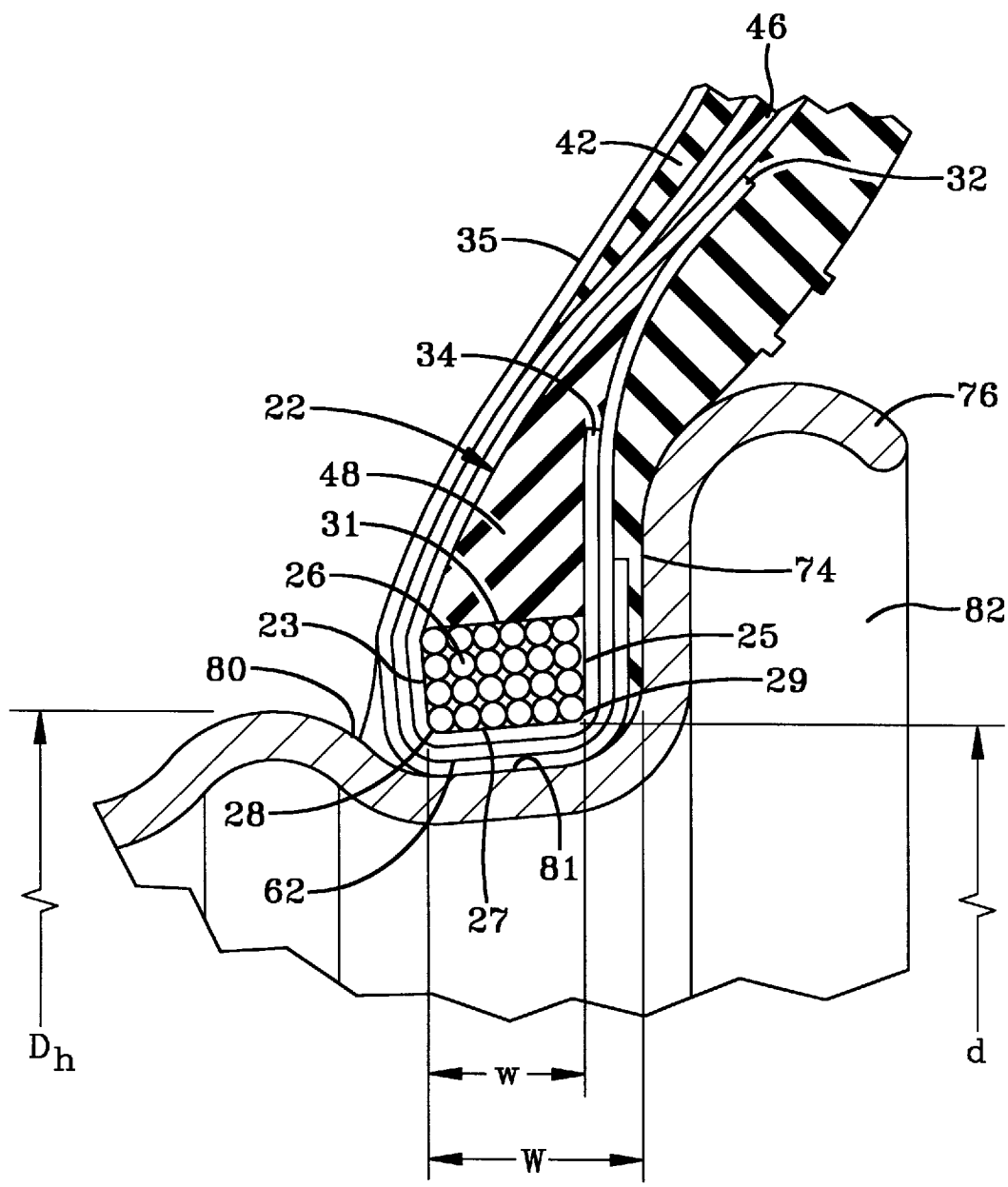
FIG. 7 is an enlarged view depicting the bead location of the run-flat tires 10,11 according to the invention shown mounted on its design rim 82.

As further illustrated in FIG. 7, the bead regions 22 for both of the tires 10 and 11 each have an annular substantially inextensible first and second bead cores 26. The bead core 26 has a flat base surface 27 defined by an imaginary surface tangent to the radially innermost surfaces of the bead wires. The flat base surface 27 has a pair of edges 28,29 and a width W between the edges. The bead core 26 has an axially inner first surface 23 extending radially from edge 28 and an axially outer second surface 25 extending radially from edge 29. The first surface 23 and the flat base surface 27 form a right angle $\alpha$ and the second surface 25 and the flat base surface 27 form an included right angle $\beta$. The angle a is greater than or equal to the angle $\beta$. In the preferred embodiment, $\alpha$ and $\beta$ equals about 90°.

The bead core 26 may further include a radially outer surface 31 extending between the first and second surfaces 23,25 respectively. The radial outer surface 31 has a maximum height as measured between surfaces 31 and 27. The height is preferably less than the width of the base BW. The cross-section defined by surfaces 23,25,27, and 31 preferably are in the form of a rectangle.

Figure 6:
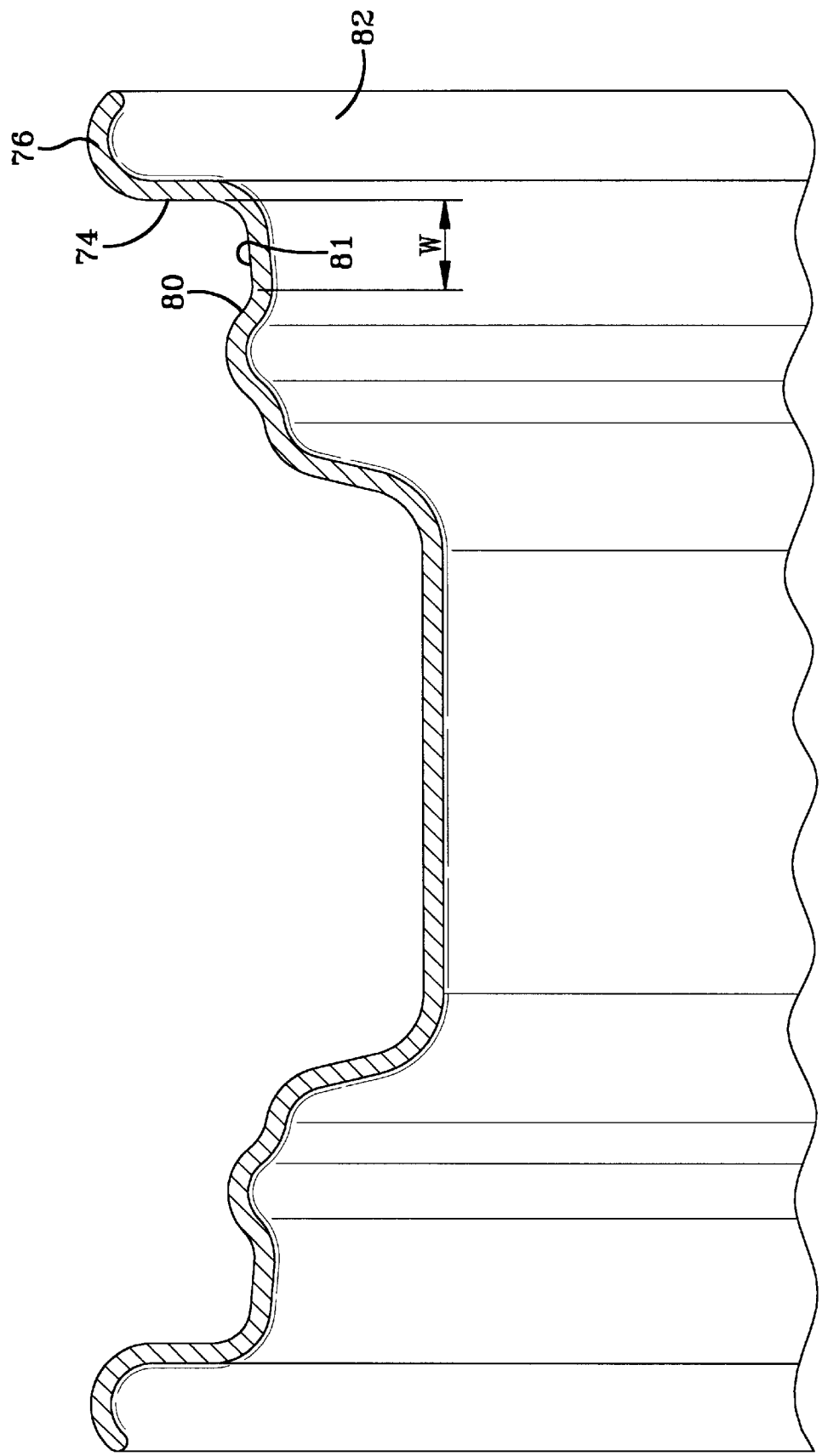
FIG. 6 is a cross sectional view of the conventional ATV design rim.

The bead core 26 is preferably constructed of four layers, each layer being formed by a separate monofilament steel wire continuously wrapped. In the preferred embodiment 0.038 inch diameter wire is wrapped in layers radially inner to radially outer of 4, 5 or 6 wires, each yielding a bead core width w in the range of greater than 65% to less than 90% of the bead seat width W of the design rim, the rim as illustrated in FIG. 6. The number of wires within a layer is further dependent on the wire diameter selected.

The flat base surface 27 of the bead cores 26 shown in FIGS. 2 and 4 are preferably, for ease of manufacture, parallel to the axis of rotation and have an inside diameter (d) of substantially equal to the rim hump 80 diameter ($D_H$). As an exemplary illustration a 10 inch nominal rim has a bead hump diameter ($D_H$) Of 10.03 inches, the rim sharp diameter is 9.968 inches and the bead seat 81 is inclined at an angle $\alpha$ of 5°. The 4×4 strip to 4×6 bead cores has an inside diameter of 10.03 inches and the rubberized material radially inward of the bead core 26 has a diameter of about 9.908 inches and tapered at an angle $\theta$ of about 5°. The tire 10,11 when being mounted first has over one-half of the bead portion 22 placed over the rim hump 80 and accordingly can stretch the remaining half of the bead portion 22 into full seating engagement with the rim 82 in a fashion similar to a button fitting through a button hole in a garment. The tire 10,11 in the bead area 22 effectually stretches out of an circular ring to a more elliptical shape until it clears the bead hump 80. As it stretches the rubber directly between the bead core 26 and the rim seat compresses sufficiently to allow the remainder of the bead 22 to pass over the bead hump 80. As shown the flat base 27 can be wider than the flat portion of the rim bead seat. This is due to the radius or curvature of the flange 76 and bead hump 80. Nevertheless, the bead core base 27 must be spaced axially outward of the peak of the rim hump 80 to insure that the bead cannot work its way off the rim seat 81 under severe loading. The above design is exceptionally well designed to stay on the rim 82 under all conditions of use including run-flat.

The flat base surfaces 27 of the first and second bead cores 26 alternatively can be inclined relative to the axis of rotation, and the bottom of the molded portion of the bead is similarly inclined, the preferred inclination being approximately about 10° relative to the axis of rotation more preferably about 10.5°. This inclination $\theta$ of the bead region 22 assists sealing the tire 10,11 and is believed to greatly reduce the bead seating pressure upon mounting and is about twice the inclination of the bead seat 81 of a conventional rim 82. This is believed to facilitate assembly and to assist retaining the beads seated to the rim 82.

Located within the bead region 22 and the radially inner portions of the sidewall portions 18,20 are high modulus elastomeric fillers 48 commonly referred to as an apex which is disposed between carcass reinforcing structure 30 and the turnup ends 32,34. These elastomeric fillers 48 extend from the radially outer portion of bead cores 26 respectively, up into the sidewall portion gradually decreasing in cross-sectional width. Preferably, the elastomeric fillers 48 terminate at a radially outer end at a distance G from the nominal rim diameter D of at least 25 percent (25%) of the section height SH of the tire. In the particular embodiment illustrated, the elastomeric fillers 48 each extend radially outward from the nominal rim diameter D a distance of approximately twenty-five percent (25%) of the maximum section height SH. For the purposes of this invention, the maximum section height SH of the tire shall be considered the radial distance measured from the nominal rim diameter D of the tire to the radially outermost part of the tread portion of the tire. Also, for the purposes of this invention, the nominal rim diameter D shall be the diameter of the tire as designated by its size.

As shown in FIGS. 1 and 2, the sidewall portions 18,20 are provided with elastomeric fillers 42 commonly referred to as inserts. These fillers 42 may be employed between the innerliner 35 and the first reinforcement ply 38. The fillers 42 extend from each bead region 22 radially to beneath the reinforcing breaker structures 36.

The elastomeric first fillers 42 have a maximum thickness B at a location approximately radially aligned between the tread shoulder and the radial location of the maximum section width of the tire 10, the thickness B being about nine percent (9%) of the maximum section height SH. For example, in a full run-flat ATV tire 10 the thickness B of the insert 42 equals 0.6 inches (15 mm). In the limited run-flat ATV tire 10 the thickness B is 6% of about 0.4 inches (10 mm).

Alternatively, as illustrated in the second embodiment tire 11 of the invention as shown in FIGS. 3 and 4, the sidewall portions 18,20 may each include a first filler 42 and a second filler 46. The first fillers 42 are positioned as described above. The second fillers 46 are located between the first and the second plies 38,40 respectively. The second filler 46 extends from each bead region 22 radially outward to beneath the reinforcing breaker structure 36.

For purposes of this invention, the maximum section width (SW) of the tire is measured parallel to the rotational axis of the tire from the axially outer surfaces of the tire, exclusive of indicia, adornment and the like. Also, for the purposes of this invention the tread width is the axial distance across the tire perpendicular to the equatorial plane (EP) of the tire as measured from the footprint of the tire inflated to maximum standard inflation pressure, at rated load and mounted on a wheel for which it was designed. In the particular embodiment tire 11 illustrated in FIGS. 3 and 4 for the full run-flat performance, the elastomeric first fillers 42 each have a maximum thickness B of approximately six percent (6%) of the maximum section height SH at a location approximately radially aligned between the tread shoulder and the maximum section width (W) of the tire.

The elastomeric second fillers 46 have a maximum thickness C of at least three point four percent (3.4%) of the maximum section height of the tire 11 at the location radially above the maximum section width of the tire. For example, in a AT23×7-10 size run-flat ATV tire 11 the thickness C of the insert 46 equals 0.22 inches (5.6 mm), at the location, approximately radially aligned between the tread shoulder and the maximum section width of the tire. The thickness B of the first filler is 0.4 inches (10 mm). The combination of filler 42,46 thicknesses can be reduced to achieve a tire 11 having a limited run-flat capability.

The overall cross-sectional thickness of the combination of elastomeric fillers 42,46,and 48 preceding from the bead cores 26 to the radial location of the maximum section width (SW) is preferably of varying thickness. The overall sidewall and carcass thickness is about 0.65 inches (16.5 mm) at the maximum section width location H and increases to an overall thickness F, in the region where it merges into the shoulder near the lateral tread edges 14,16, F being about 0.75 inches (19 mm) or one hundred and fifteen percent (115%) of the overall sidewall thickness as measured at the maximum section width SW of the tire 11. Preferably, the overall thickness F of the sidewall in the shoulder region of the tire 11 is at least one hundred percent (100%) of the overall sidewall thickness at the maximum section width (SW), more preferable less than 150%.

Figure 5:
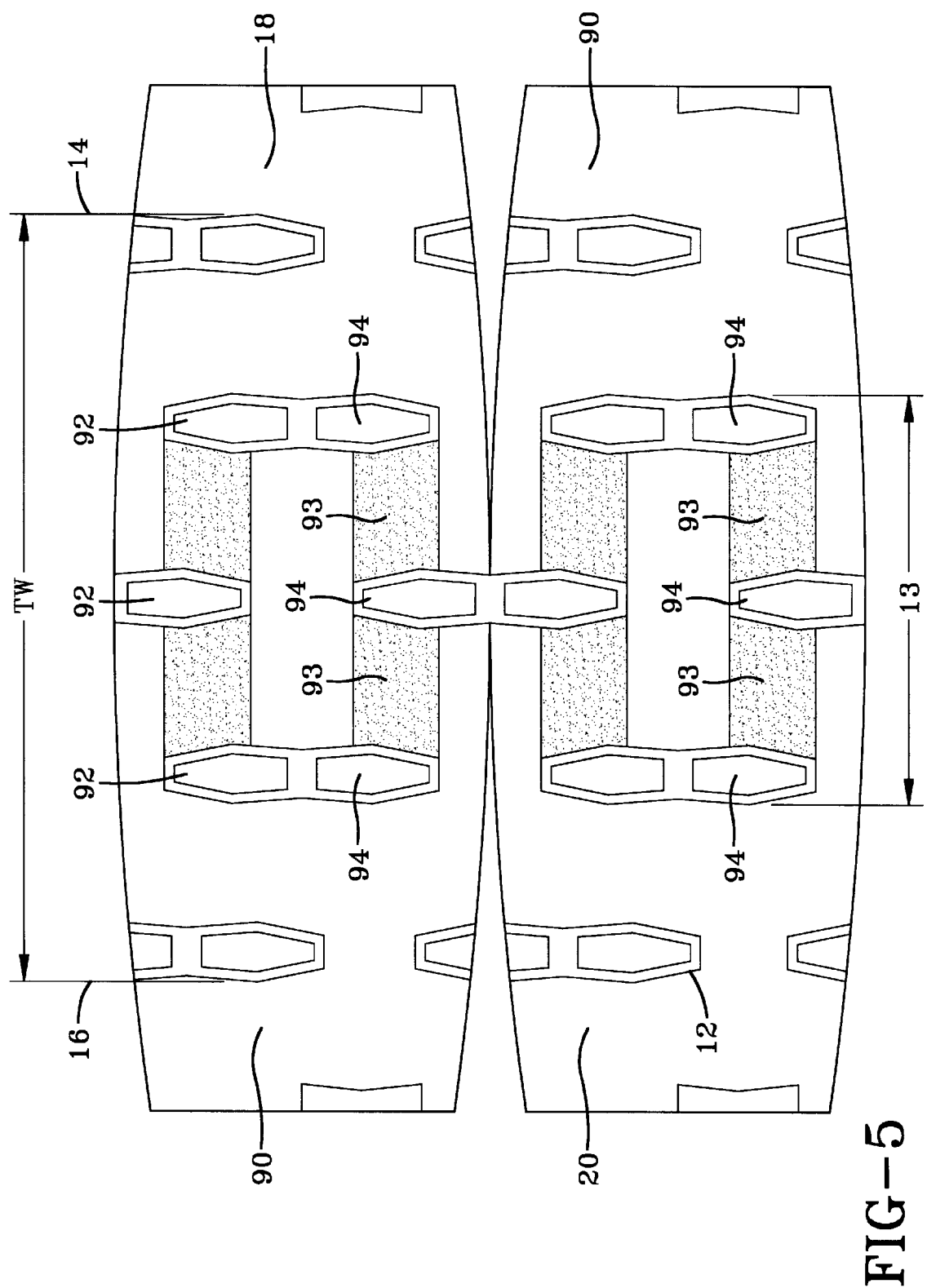
FIG. 5 is a partial plan view of the tread of the run-flat tire made in accordance with the present invention.

This thin sidewall construction 18,20 is made possible by the employment of the unique tread design 12. This tread 12 can be made of any number of cross-sectional shapes however the resultant central portion 13 must, have partial or full laterally extending ribs 92 which, exhibit a strength sufficient to support a portion of the dynamic load without collapsing the tread. FIG. 5 shows a preferred tread 12 having a radially inner tread base 90 and a plurality of radially projecting laterally extending tread ribs 92 in the center 13 of the tread 12. Preferably the ribs 92 are made of the circumferentially extending lugs 94 and reduced height tie bars 93 connected to lugs 94 of laterally adjacent circumferential rows. The combination of these adjacent lugs connected by reduced height tie bars 93 thus, forming partial ribs 92 as illustrated.

The illustrated tread 12 not only keeps the tread belt package unbuckled when the tire 10,11 is operated under load and uninflated, it actually can contribute to the load carrying capacity when the tread 12 is constructed as taught above. The primary contributing factor of the tread 12 as illustrated is that when the tire is uninflated, the central portion 13 of the tread has sufficient strength to keep the lug edges 95 in tractive ground engaging contact. Conventional open lug tread patterns common in ATV tires tend to buckle adjacent the center preventing the central portion of the tread from contacting the ground thus a severe loss of traction and handling can result.

Applicants have found that by placing one or more reinforcing elastomeric fillers 42,46 between the adjacent liner 35 or reinforcing ply structures 38,40 in the manner previously described in combination with the central rib or partial rib reinforced tread 12, high levels of run flat performance can be obtained. During normal operation of the tires 10,11 the inflated medium provides the necessary support to carry the load. However, when the tire is operated in the uninflated state, the reinforced sidewall portions 18,20 and the tread 12 must support the entire load. The tire construction of the present invention permits efficient use of the carcass structure 30 in the uninflated condition while also providing the desired operating performance characteristics of the tire when operated in the inflated low pressure state. When the run-flat tire 10,11 is designed to be a limited run-flat tire and is operated in the uninflated state, deflection of the tire is only slightly greater than when operated in the inflated state. The internal surfaces of the tire do not come into contact with each other during operation in the uninflated state. Pneumatic ATV tires made in accordance with the present invention have been found to be capable of operation in the uninflated state for distances of about 500 miles (800 km) at speeds of up to 25 miles per hour (40 km/h) at a maximum load of 130% of the normal rated load per Tire and Rim Association in laboratory wheel endurance tests. After operating uninflated, the repaired and inspected tire can be returned to normal operation in the inflated state. The drivable range in the uninflated condition is believed to be well in excess of 100 miles (160 km) depending on the load and environmental conditions The structural load supporting stiffness of the tire in the uninflated condition is primarily a function of the combination of strength of the tread 12 and the reinforced sidewall thickness. The sidewall thickness is measured exclusive of ornamentation such as lettering, numerals, decorative ribs and other such cosmetic features.

The sidewalls 18,20 ability to support the load is related to the column height and the thickness of the column. In the present invention the section height of the tire and the sidewall filler thickness have formed a ratio ST/SH. As the load increases the ST/SH ratio should also increase.

Ideally, the spring rate of the run-flat tire in the inflated condition should not change appreciably from that of a conventional non-run-flat ATV pneumatic tire. For the limited run-flat tire the inflated spring rate at 4 psi and recommended normal load should be less than 135% of the conventional ATV tire of similar size. When the run-flat tire is operated in the uninflated state in a condition the inventors refer to as limited run-flat, the spring rate must be sufficient to prevent the tire from buckling or collapsing onto itself.

Nevertheless, the inventor believes that the spring rate must be sufficiently low so that the driver can appreciate or feel that the tire is being run-flat. This means that if an inflated run-flat tire has a spring rate of $\chi$, the same tire when uninflated should have a spring rate in the range of 50% to 90% $\chi$, preferably 50% to 80% $\chi$.

Alternatively, the inventors have found that the tire described above can be designed to operate at an uninflated spring rate approximately equal to or slightly above the spring rate of a convention nonrun-flat tire of the same size. In such a case the run-flat ATV tire of the present invention can be operated nonpneumatically on a continuous basis at speed at or below 50 mph. This is due in part to the reduced load and speeds of ATV type vehicles compared to normal passenger type tires. The full time run-flat ATV tire will have basically the same handling and feel as the convention nonrun-flat ATV tires depending on the selected spring rate chosen. At spring rates of 120% $\chi$ these uninflated tires naturally will be slightly stiffer feeling to the driver but very acceptable ride handling data have been achieved up to that rate. Much higher spring rates would likely lead to uncomfortable ride characteristics.

The following Table A discloses a set of exemplary ATV front and rear tires 10,11 made in accordance to the invention. Embodiment 1 is the tire 10 made according to FIGS. 1 and 2. Embodiment 2 is the tire 11 made according to FIGS. 3 and 4. The embodiment 1 tires 10 were made with a spring rate selected for limited run-flat performance, while the embodiment 2 tire 11 was made with a spring rate which could yield full run-flat or nonpneumatic performance. the spring rates are given in lb/in at inflation pressures of 0 psi, 2 psi and 4 psi. Endurance measurements at 0 psi were measured in miles. The endurance test was conducted at 25 mph for 34 hours at a maximum rated load of 130% for the front full run-flat embodiment tire 11. This resulted in yielding 850 miles of run-flat performance without evidence of tire failure. The limited run-flat front tire 10 showed a sidewall collapse after 575 miles of run-flat exposure. Similarly the rear tires 10,11 embodiment 1 and 2 yielded the following endurance mileage of an estimated 500 miles and 850 actual miles respectively. These tires were compared to a conventional ATV pneumatic control tire of similar sizes for the front and rear wheel positions. The comparative spring rates are shown in Table A. The tire size was 0AT23×7-10 for the front tires and 22×11.00-10NHS for the rear tires.

TABLE A

|  | Control Tire | | Embodiment 1 | | | Embodiment 2 | | |
| --- | --- | --- | --- | --- | --- | --- | --- | --- |
| Inflation Pressure | 0 psi | 4 psi | 0 psi | 2 psi | 4 psi | 0 psi | 2 psi | 4 psi |
| Front Wheel Position Spring Rate | 76 | 159 | 144 | 176 | 207 | 185 | 203 | 230 |
| Front Wheel Position Run-Flat Endurance | 0 miles | | 575 miles | | | 850 miles | | |
| Rear Wheel Position Spring Rate | — | 274 | — | — | — | 297 | 366 | 394 |
| Rear Wheel Position Endurance | 0 miles | | 500 miles estimated | | | 850 miles | | |

As can be seen from Table A the limited run-flat tire 10 has a spring rate which at 0 psi is less than the normally inflated conventional ATV tire. The full run-flat tire 11 at 0 psi has a recommended spring rate equal to or greater than the inflated spring rate of a conventional ATV tire, preferably less than 125% of the spring rate of the vehicle manufacturer's recommended same size conventional pneumatic ATV tire at its recommended inflation pressure and load. The limited run-flat tire has a 0 psi spring rate of preferably 50% to 80% of its 4 psi inflated and loaded spring rate. Ideally, the limited run-flat first embodiment tire 10 has an uninflated spring rate of 50% to 91% of the spring rate of the vehicle manufacturer's recommended same size conventional pneumatic tire at its inflation pressure and load.

Run-flat performance of the tire may be further enhanced by providing the ply coat of each layer of the reinforcing ply structures 38,40 with an elastomeric material having substantially the same physical properties as that of the elastomeric fillers 42,46. As is well known to those skilled in the tire art, the ply coat of a fabric layer is the layer of unvulcanized elastomeric material which is applied to fabric prior to its being cut to its desired shape and applied to the tire on the tire building drum. Preferably, the elastomeric material used as a ply coat for the ply layers is similar to the elastomeric material used in the reinforcing fillers 42,46.

In practice, the rubber compositions for the first fillers 42, second fillers 46 and the ply coats for one or more ply structures 38 and 40 utilized in this invention for the aforesaid pneumatic tire construction are preferably characterized by physical properties which enhance their utilization in the invention which are, collectively, believed to be a departure from properties of rubber compositions normally used in pneumatic tire sidewalls, particularly the combination of first and second fillers 42 and 46 with plies 38 and/or 40 having similar high stiffness/low hysteresis properties as hereinafter described.

Preferably, while the discussion herein refers to the ply coat(s) being for one or more of ply structures 38 and 40, in the practice of this invention, the plycoats referenced herein refers to plycoats for both plies 38 and 40 unless only one of such plies is used.

In particular, for the purposes of this invention, both of the aforesaid fillers 42 and 46 are characterized by having a high degree of stiffness yet by also having a relatively low hysteresis for such a degree of stiffness.

The stiffness of the rubber composition for fillers 42 and 46 is desirable for stiffness and dimensional stability of the tire sidewall.

The stiffness of the rubber composition for the ply coat for one or more of plies 38 and 40 is desirable for overall dimensional stability of the tire carcass, including its sidewalls, since it extends through both sidewalls and across the crown portion of the tire.

As a result, it is considered that the stiffness properties of the aforesaid rubber compositions of the first and second fillers 42 and 46 and of the ply structures 38 and/or 40 cooperate with the plies 38 and/or 40 to reinforce each other and to enhance the aforesaid dimensional stability of the tire sidewalls to a greater degree than if either of the aforesaid fillers or plycoats were alone provided with a high stiffness rubber composition.

However, it is to be appreciated that rubbers with a high degree of stiffness in pneumatic tires normally be expected to generate excessive internal heat during service conditions (operating as tires on a vehicle running under load and/or without internal inflation pressure), particularly when the rubber's stiffness is achieved by a rather conventional method of simply increasing its carbon black content. Such internal heat generation within the rubber composition typically results in a temperature increase of the stiff rubber and associated tire structures which can potentially be detrimental to the useful life of the tire.

The hysteresis of the rubber composition is a measure of its tendency to generate internal heat under service conditions. Relatively speaking, a rubber with a lower hysteresis property generates less internal heat under service conditions than an otherwise comparable rubber composition with a substantially higher hysteresis. Thus, in one aspect, a relatively low hysteresis is desired for the rubber composition for the fillers 42 and 46 and the plycoat(s) for one or more of the plies 38 and 40.

Hysteresis is a term for heat energy expended in a material (eg: cured rubber composition) by applied work and low hysteresis of a rubber composition is indicated by a relatively high rebound, a relatively low internal friction and relatively low loss modulus property values.

Accordingly, it is important that the rubber compositions for the fillers 42 and 46 and plycoats for one or more of plies 38 and 40 have the properties of both relatively high stiffness and low hysteresis.

The following selected desirable properties of the rubber compositions for the fillers 42 and 46 as well as for the plycoats for one or more of the plies 38 and 40 are summarized in the following Table 1.

TABLE 1

| Properties | Filler | Ply Coat |
|---|---|---|
| Hardness (Shore A)[2] | 60–70 | 60–70 |
| Modulus (100%) MPa[3] | 5–7 | 4–6 |
| Static Compression[1] | 0.1–0.15 | 0.15–0.2 |
| Heat Buildup (°C.)[1] | <30 | <30 |
| Cold Rebound (about 23° C.)[4] | 55–70 | 55–70 |
| E' at 100° C. (MPa) | 10–15 | 10–15 |
| E" at 100° C. (MPa) | 0.5–1.5 | 1–1.5 |

[1] Goodrich Flexometer Test—ASTM Test No. D623
[2] Shore Hardness Test—ASTM Test No. D2240
[3] Tension Modulus Test—ASTM Test No. D412
[4] Zwick Rebound Test—DIN 53512

The indicated hardness property is considered to be a moderate rubber hardness.

The indicated modulus property at 100% modulus is utilized instead of a 300% modulus because the cured rubber has a relatively low ultimate elongation at its breaking point. Such a cured rubber is considered very stiff.

The indicated static compression property, measured on a flexometer, is another indication of the relatively high stiffness of the cured rubber.

The indicated E' property is a coefficient of the storage or elastic moduli component of the viscoelastic property which is an indication of the material (eg: cured rubber composition) stiffness.

The indicated E" property is a coefficient of the loss or viscous moduli component of the viscoelastic property which is an indication of the hysteretic nature of the material (eg: cured rubber composition).

The utilization of both the E' and E" properties to characterize stiffness and hysteresis of rubber compositions is well known to those having skill in such characterizations of rubber.

The indicated heat buildup value is measured by a Goodrich flexometer (ASTM D623) test and is indicative of the internal heat generation of the material (eg: cured rubber composition).

The indicated cold rebound test property at about 23° C. (room temperature) is measured by Zwick Rebound Test (DIN 53512) test and is indicative of the material's (eg: cured rubber composition) resilience.

Thus, the properties illustrated in Table 1 indicate a cured rubber composition with a relatively high stiffness, moderate hardness and a relatively low hysteresis for a rubber with such a high stiffness.

The low hysteresis is demonstrated by the relatively low heat buildup, low E" and high rebound properties and is considered necessary for a rubber composition desired to have a relatively low internal heat buildup in service.

In the compounding of the various tire components, various rubbers may be used which are, preferably, relatively high unsaturation diene-based rubbers. Representative examples of such rubbers are, although they may not be so limited, are: styrene-butadiene rubber, natural rubber, cis 1,4 and 3,4-polyisoprene rubbers, cis 1,4 and vinyl 1,2-polybutadiene rubbers, acrylonitrile-butadiene rubber, styrene-isoprene-butadiene rubber and styrene-isoprene rubber.

Various of the preferred rubbers for the rubber compositions for the fillers 42 and 46 and for the plycoat(s) for one or more of the plies 38 and 40 are natural cis 1,4-polyisoprene rubber, isoprene/butadiene rubber, and cis 1,4-polybutadiene rubber.

Preferred combinations, or blends, of rubbers are natural cis 1,4-polyisoprene rubber and cis 1,4-polybutadiene rubber for the fillers and natural cis 1,4-polybutadiene rubber and isoprene/butadiene copolymer rubber for the plycoat(s).

In a preferred practice, based on 100 parts by weight rubber, (A) the fillers are comprised of about 60 to 100, preferably about 60 to 90, parts natural rubber and, correspondingly, up to about 40, preferably about 40 to about 10, parts of at least one of cis 1,4 polybutadiene rubber and isoprene/butadiene rubber preferably cis 1,4-polybutadiene rubber, where said isoprene/butadiene rubber, if used, is present in a maximum of 20 parts, and (B) the said plycoat(s) are comprised of up to 100, preferably about 80 to about 100 and more preferably about 80 to about 95, parts natural rubber and, correspondingly, up to about 100, preferably up to about 20 and more preferably about 20 to about 5, parts of at least one of isoprene/butadiene copolymer rubber and cis 1,4 polybutadiene rubber, preferably an isoprene/butadiene rubber; wherein the ratio of isoprene to butadiene in said isoprene/butadiene copolymer rubber is in a range of about 40/60 to about 60/40.

It is further contemplated, and is considered to be within the intent and scope of this invention that a small amount, such as about 5 to about 15 parts, of one or more organic solution polymerization prepared rubbers may be included with the aforesaid natural rubber, and cis 1,4 polybutadiene rubber and/or isoprene/butadiene rubber composition(s) for the said fillers and/or plycoat(s), of which the option and selection of such additional rubber(s) can be made by one having skill in the rubber compounding art without undue experimentation.

Thus, in such circumstance, the description of the filler and plycoat rubbers is set forth in a "comprising" manner with the intent that small amounts of such solution polymerization prepared elastomers can be added so long as the aforesaid physical property parameters of the cured rubber compositions are met. It is considered that such rubber compounding is within the skill of those with experience in the rubber compounding art without undue experimentation.

While not necessarily limited thereto, such other contemplated solution prepared rubbers are styrene/butadiene, and polymers of one or more of isoprene and butadiene such as 3,4-polyisoprene, styrene/isoprene/butadiene terpolymers and medium vinyl polybutadiene.

It should readily be understood by one having skill in the art that rubber compositions for components of the pneumatic tire, including the first and second fillers 42 and 46 as well as ply coat(s) for one or more or plies 38 and 40, can be compounded by methods generally known in the rubber compounding art, such as mixing the various sulfurvulcanizable constituent rubbers with various commonly used additive materials such as, for example, curing aids, such as sulfur, activators, retarders and accelerators, processing additives, such as rubber processing oils, resins including tackifying resins, silicas, and plasticizers, fillers, pigments, stearic acid or other materials such as tall oil resins, zinc oxide, waxes, antioxidants and antiozonants, peptizing agents and reinforcing materials such as, for example, carbon black. As known to those skilled in the art, depending on the intended use of the sulfur vulcanizable and sulfur vulcanized materials (rubbers), the certain additives mentioned above are selected and commonly used in conventional amounts.

Typical additions of carbon black comprise about 30 to about 100 parts by weight, of diene rubber (phr), although about 40 to about a maximum of about 70 phr of carbon black is desirable for the high stiffness rubbers desired for the indicated fillers and plycoat(s) used in this invention. Typical amounts of resins, if used, including tackifier resins and stiffness resins, if used, including unreactive phenol formaldehyde tackifying resins and, also stiffener resins of reactive phenol formaldehyde resins and resorcinol or resorcinol and hexamethylene tetramine may collectively comprise about 1 to 10 phr, with a minimum tackifier resin, if used, being 1 phr and a minimum stiffener resin, if used, being 3 phr. Such resins may sometimes be referred to as phenol formaldehyde type resins. Typical amounts of processing aids comprise about 4 to about 10.0 phr. Typical amounts of silica, if used, comprise about 5 to about 50, although 5 to about 15 phr is desirable and amounts of silica coupling agent, if used, comprise about 0.05 to about 0.25 parts per part of silica, by weight. Representative silicas may be, for example, hydrated amorphous silicas. A representative coupling agent may be, for example, a bifunctional sulfur containing organo silane such as, for example, bis-(3-triethoxy-silylpropyl) tetrasulfide, bis-(3-trimethoxy-silylpropyl) tetrasulfide and bis-(3-trimethoxysilylpropyl) tetrasulfide grafted silica from DeGussa, AG. Typical amounts of antioxidants comprise 1 to about 5 phr. Representative antioxidants may be, for example, diphenyl-p-phenylenediamine and others, such as those disclosed in the *Vanderbilt Rubber Handbook* (1978), pages 344–346. Suitable antiozonant(s) and waxes, particularly microcrystalline waxes, may be of the type shown in the *Vanderbilt Rubber Handbook* (1978), pages 346–347. Typical amounts of antiozonants comprise 1 to about 5 phr. Typical amounts of stearic acid and/or tall oil fatty acid may comprise about 1 to about 3 phr. Typical amounts of zinc oxide comprise about 2 up to about 8 or 10 phr. Typical amounts of waxes comprise 1 to about 5 phr. Typical amounts of peptizers comprise 0.1 to about 1 phr. The presence and relative amounts of the above additives are not an aspect of the present invention which is primarily directed to the utilization of specified blends of resins in tire treads as sulfur vulcanizable compositions.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 8 phr with a range of from 3 to about 5 being preferred for the stiff rubbers desired for use in this invention.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 3 phr. In another embodiment, combinations of two or more accelerators in which a primary accelerator is generally used in the larger amount (0.5 to about 2 phr), and a secondary accelerator which is generally used in smaller amounts (0.05–0.50 phr) in order to activate and to improve the properties of the vulcanizate. Combinations of such accelerators have historically been known to produce a synergistic effect of the final properties of sulfur cured rubbers and are often somewhat better than those produced by use of either accelerator alone. In addition, delayed action accelerators may be used which are less affected by normal processing temperatures but produce satisfactory cures at ordinary vulcanization temperatures. Representative examples of accelerators include amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound, although a second sulfenamide accelerator may be used. In the practice of this invention, one and sometimes two, or more accelerators are preferred for the high stiffness rubbers.

The tire can be built, shaped, molded and cured by various methods which will be readily apparent to those having skill in the art.

EXAMPLE 1

The following rubber compositions are provided which are intended to exemplary of rubber compositions with properties which can fall within those exemplified in Table 1.

Rubber compositions are prepared and mixed by conventional rubber mixing processes and comprised of the materials shown in Table 2 which represent rubber compositions which may be contemplated for use as fillers 42 and 46 and ply coat(s) for one or more of plies 38 and 40. The indicated amounts of materials have been rounded for the illustration of this Example.

TABLE 2

| | (Parts by Weight) | |
|---|---|---|
| Material | Plycoat | Filler |
| Natural Rubber[1] | 90 | 80 |
| Isoprene/Butadiene Rubber[2] | 10 | 0 |
| Polybutadiene (cis 1,4-) Rubber[3] | 0 | 20 |
| Carbon black | 55 | 55 |
| Silica & Coupler | 6 | 6 |
| Zinc Oxide | 5 | 8 |
| Accelerators (Sulfenamide type) | 4 | 2 |
| Sulfur (insol w/20% oil) | 2 | 4 |

[1].Cis 1,4-polyisoprene type
[2].Copolymer with ratio of isoprene to butadiene of about 1:1
[3].A high cis 1,4 polybutadiene rubber Conventional amounts of rubber processing oil and tall oil fatty acid, collectively about 5 parts with a minimum of 1 part each; antidegradants; tackifying and stiffening resins, primarily of the phenolformaldehyde type in an amount of about 6 phr; and silica and coupling agent therefore; are used with two accelerators for the plycoat sample and one accelerator for the filler rubber composition sample.

The rubber compositions are molded and cured at about 150° C. for about 20 minutes.

In the practice of this invention, it is considered important that the rubber compositions for both the fillers 42 and 46 and the ply coat(s) for one or more of plies 38 and 40 are relatively very stiff, moderately hard, and have a low hysteresis.

Further, it is normally desired that the rubber composition for fillers 42 and 46, relative to the rubber composition for plycoats for plies 38 and/or 40 is slightly stiffer, slightly harder and that both of the rubber compositions have a relatively low hysteresis It is important to appreciate that the indicated physical properties of the rubber compositions in Table 1 are for samples thereof and that the dimensions, including thickness, of the resulting tire components (fillers and plies) need be taken into account as factors contributing to the overall stiffness and dimensional stability of the tire sidewall and carcass.

It is considered important that the stiffness of the rubber composition for fillers 42 and 46 is somewhat greater than that of the aforesaid ply coat rubber composition because they are not a part of a fabric reinforced ply and further, because it is desired to somewhat maximize their stiffness property. The hysteresis, or E", and heat buildup values for the rubber composition for the aforesaid fillers is desirably somewhat lower than that for the rubber composition for the aforesaid ply coat(s) because of the bulk of the fillers versus the thin dimensions of the fabric reinforced plies.

Chafing of the tire in the lower bead region radially outward of the carcass structure 30 adjacent the rim flange although not required in the preferred embodiment tires 10,11, may be minimized, especially during use of the tire in the uninflated condition, by providing hard rubber chafer portion.

While certain representative embodiments and details have been shown for the purpose of illustrating the invention, it will be apparent to those skilled in this art that various changes and modifications may be made therein without departing from the spirit or scope of the invention.

What is claimed is:

1. In combination a run-flat low-pressure all terrain vehicle tire and a rim, the tire comprising:

an annular tread, the tread having a pair of lateral edges;

a pair of annular bead cores, and wherein the annular bead cores have a substantially flat radially inner base, the inner base having a diameter d, and an axial width w, a carcass radially inward of the annular tread, the carcass having one or more cord reinforced plies extending to and wrapped about the bead cores;

an elastomeric apex adjacent to and extending radially outward from each bead core; and a first pair of elastomeric inserts radially inward of the carcass plies one elastomeric insert extending radially inward from each lateral edge of the tread toward each bead core and terminating radially and axially inward of a radially outer portion of the elastomeric apex and the rim comprising:

a hump and a rim flange, the rim flange having an axially inward surface, the distance between the hump and the axially inward surface of the rim being the bead seat, the bead seat having a width W, the rim having a nominal diameter D, the hump having a diameter $D_H$; and the tire satisfies the relationship wherein the diameter d of the inner base of the bead core is substantially equal to the diameter $D_H$ and the width w of the inner base of the bead core is in the range of 65% to 90% of the width W of the bead seat.

2. The run-flat low-pressure all terrain vehicle tire of claim 1 further comprising:

a plurality of tread lugs extending radially outwardly from the tread; and a plurality of tie bars, one or more tie bars connecting laterally adjacent tread lugs within a central region of the tread.

3. The run-flat low-pressure all terrain tire of claim 1 wherein the tire has a nominal bead diameter of equal to or less than 12 inches.

4. The run-flat low-pressure all terrain tire of claim 3 wherein the tire has a nominal bead diameter in the range of 5.0 to 12.0 inches.

5. The run-flat low-pressure tire of claim 1 wherein the normal inflation pressure is less than 10 psi.

6. The run-flat low-pressure all terrain tire of claim 1 wherein the tire has a maximum section width SW and an overall diameter OD, the ratio of the section width SW divided by the overall diameter OD is in the range of 25% to 50%.

7. The run-flat low-pressure all terrain tire of claim 1 further comprises a:

second pair of elastomeric inserts, the second pair of inserts extending radially between the tread edges and the bead cores and being spaced axially outwardly from the first pair of inserts and at least one carcass ply.

8. The run-flat low-pressure all terrain tire of claim 1 wherein the tire has an overall section height (SH) and the elastomeric apex extends radially outwardly to a distance at least 25% of the section height (SH).

9. The low-pressure tire of claim 1 wherein the tire when mounted on its design rim has each bead core, comprising multiple layers of wires the radially innermost layer of wires being the bead base the bead base having an axial width w of greater than 0.25 of an inch and less than 0.342 of an inch.

10. A run-flat low-pressure all terrain vehicle tire of claim 1 wherein the tire when normally loaded and inflated has a spring rate ($\chi$) and when the tire is deflated, the tire has a spring rate 50% to 90% of inflated spring rate $\chi$.

11. A run-flat low-pressure all terrain vehicle tire of claim 10 wherein the loaded tire has an inflated spring rate at 4 psi inflation of less than 135% of the spring rate of the vehicle manufacture's recommended same size conventional pneumatic tire inflated to 4 psi pressure and under the same load.

12. A run-flat low-pressure all terrain vehicle tire of claim 11 wherein the tire has an uninflated spring rate of 50% to 91% of the spring rate of the vehicle manufacture's recommended same size conventional pneumatic tire at its recommended inflation pressure and load.

13. A run-flat low-pressure all terrain vehicle tire of claim 1 wherein the tire has an uninflated spring rate of 125% or less of the spring rate of the vehicle manufacture's recommended same size conventional pneumatic tire at its recommended inflation pressure and load.

* * * * *